United States Patent [19]  
Richard

[11] 4,384,164
[45] May 17, 1983

[54] SYSTEMS FOR FOLDING AND STABILIZING SOLAR PANELS
[75] Inventor: Daniel C. Richard, Wassenaar, Netherlands
[73] Assignee: Organisation Europeenne de Recherches Spatiales, France
[21] Appl. No.: 282,815
[22] Filed: Jul. 13, 1981
[30] Foreign Application Priority Data
Jul. 11, 1980 [FR] France ............................ 80 15502
[51] Int. Cl.³ ........................................... H01L 31/04
[52] U.S. Cl. ................................... 136/245; 136/292
[58] Field of Search ................. 136/245, 292; 244/173
[56] References Cited
U.S. PATENT DOCUMENTS
3,756,858 9/1973 Dillard ............................... 136/245
3,783,029 1/1974 Dillard et al. ...................... 136/245

Primary Examiner—Aaron Weisstuch
Attorney, Agent, or Firm—Antonelli, Terry & Wands

[57] ABSTRACT

The present invention relates to a novel system for folding and stabilizing flexible and continuous solar panels including fold lines. The folding system comprises a V-shaped element having arms whose free ends are fixed on both sides of the corresponding fold line of the panel, while the tip of the V is connected to the fold line itself by means of a pull sheet. The arms of the V-shaped element have a camber when the panel is unfolded, so as to exert a pulling force on the fold line, said folding systems being optionally associated with suitable stabilizing systems. The invention is useful in the folding and stabilizing of solar panels.

16 Claims, 6 Drawing Figures

SYSTEMS FOR FOLDING AND STABILIZING SOLAR PANELS

BACKGROUND OF THE INVENTION

1. Field of the Invention

The present invention relates to a novel system for folding solar panels and to stabilizing means for the latter.

2. Description of the Prior Art

One of the principal conditions required of solar panels of large size planned for the future is represented by their ability to be folded up before returning to earth or before an important operation in orbit.

In the prior art, until now, two types of flexible solar panels have been used:

panels of the wound type and
panels of the accordion type.

Solar panels of the wound type are wound around a drum which can only be fixed to the launching vehicle at two different points, that is to say at the two ends of the axle of the drum, which leads to instability. By reason of the absence of other fastening points, the size of this flexible solar panel is limited and, consequently, the power generated by such a panel is generally less than 5 KW.

As regards accordion type solar panels, they can be stored in a box which can easily be fixed to the launching vehicle.

Solar panels in accordion form can comprise three types of folding systems:

discontinuous panels with piano hinges;
continuous panels folded at regular intervals and
a combination of the two foregoing systems known as a "hybrid system".

The first folding system which uses piano hinges is not reliable since it requires a very large number of moving parts. Furthermore, it is difficult to repair since each sub-panel introduces a discontinuity into the electrical wiring. Also, the thickness of the hinges is difficult to adapt to that of the support panel, which is only a few microns thick, which results in the positioning of a complicated electrical installation and imparts risks to the use of ultra-thin cells.

The second folding system, which uses a continuous panel, exhibits difficulties which are essentially due to the fact that the fold loses its memory as a result of the numerous stresses that it undergoes in practice; and the fold is not stable when the support panel is placed under compression, which means that the support panel has locally a tendency to be folded back in reverse direction from that in which it should be folded. Such a tendency subjects the cells which are in the vicinity of the fold to very high stresses which can result in the rupture of the cells; and the environment causes permanent undulations along the fold line, which further increases the instability of the folding.

The third system, constituted by a non-continuous panel including piano hinges which connect different sub-panels together, each of the sub-panels being folded at regular intervals, possesses in spite of the fact that it facilitates manufacture and integration of the panel the drawbacks of the two preceding systems.

It is accordingly an object of the present invention to provide a system of folding solar panels which responds to the the necessities of practice better than the folding systems proposed according to the prior art.

It is notably an object of the invention to provide a folding system which is simple, which has high reliability since it does not require mechanical parts, and wherein the folding system enables the construction of solar panels without size limitations.

It is another object of the invention to provide a folding system for solar panels which enables electric power of 25 KW–50 KW to be attained, which will be necessary for future space uses.

It is another object of the invention to provide flexible solar panels provided with a folding system according to the invention which is adaptable to flexible solar panels designed in accordance with the arrangements of the prior art.

GENERAL DESCRIPTION OF THE INVENTION

According to the present invention there are provided novel folding and stabilizing systems for flexible, continuous solar panels (i.e., solar arrays) having fold lines formed at regular intervals, which folding systems are characterised in that they comprise a V-shaped element whose rigidity outside the plane is greater than that of the folded panel, which V-shaped element is fixed through one of its ends to one side of the fold line of the panel and through its other end to the other side of the fold line, the tip of the V being connected to the fold line itself by means of a special stretcher sheet, said folding systems being optionally associated with suitable stabilizing systems for said panels.

Such a structure, combining a V-shaped element, whose ends are fixed to the solar panel on each side of the fold line, with a sheet playing the role of a stretcher which connects the inside top of the V directly to the fold line, provides a positive or active memory.

According to an advantageous feature of the invention, each of the arms of the V-shaped element is fastened through its free end to the panel at a predetermined distance $b$ from the fold line, wherein the width of the sheet playing the role of a stretcher member—calculated from the inside top of the V to the fold line— is equal to B and the length of each of said arms is equal to $b+B$, thus conferring deformation properties on the V-shaped element.

In fact, in a right-angled triangle, the sum of the lengths of the sides of the right angle is greater than the length forming the hypotenuse, namely $\quad b + B > c \quad$ (1)

and since
$$c = \sqrt{b^2 + B^2} \quad (2)$$

whence
$$b + B > \sqrt{b^2 + B^2} \quad (3)$$

In the case of the invention, $b+B=c'\quad$ (4)

hence
$$c' > \sqrt{b^2 + B^2} \quad (5)$$

and $\quad c' > c \quad$ (6)

thus procuring the desired deformation in the V-shaped element, which deformation introduces a tractive force F which is applied to the fold line, through the stretcher member, to oblige the solar panel to fold up only in one and the same direction during each folding operation.

The present invention is directed particularly to folding and stabilizing systems for solar panels in accordance with the foregoing features, as well as to the means applied for their production; to solar panels equipped with these systems; and to satellites bearing solar panels provided with folding and stabilizing systems according to the invention.

BRIEF DESCRIPTION OF THE DRAWINGS

The invention will be better understood by means of the additional description which follows, with reference to the accompanying drawings in which.

Figure 1:
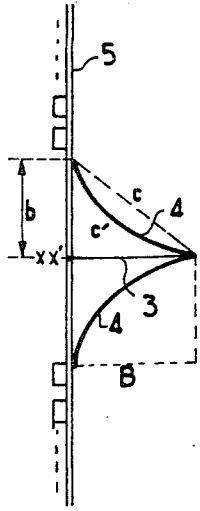
FIG. 1 is a diagrammatic drawing in section of a deployed solar panel provided with a folding system in accordance with the features of the invention.

It must be understood however, that these drawings and the corresponding description are given purely by way of illustration of the invention and do not constitute in any way a limitation thereof.

DESCRIPTION OF PREFERRED EMBODIMENTS

As is shown in FIGS. 1–4, a solar panel or array, generally designated by the reference numeral 1 is folded along a fold line XX'. The solar panel 1 is composed of conventional solar cells 5 which may, for example, include a layer of "KAPTON" (registered trademark of DU PONT DE NEMOURS denoting a polyimide resin), a layer of fiberglass, solar cells and electrical wiring. A V-shaped element, generally designated the reference numeral 2, includes two arms 4, respectively fastened on each side of the fold line XX', at a distance b from the latter. The fold line XX' is connected to the top of the V by a sheet which functions as a stretcher member 3. The stretcher member 3 may advantageously be formed of, for example, "KAPTON". The width of the stretcher member 3 is equal to B. Each of the arms 4 of the V-shaped element 2 has a length equal to b+B, resulting in the arms 4 having a predetermined curvature. The deformation of the arms 4, which is weak and elastic, exerts a tractive force on the fold line XX'. The V-shaped element 2, by reason of its construction, does not lose its memory and due to the tensioning force induced in the stretcher member 3 the solar panel 1 can only fold up in a single direction.

This deformation results from the equations (1) to (6) above, c', which is the length of each of the arms of the V-shaped elements being greater than c or equal to $c+\epsilon$, the value $\epsilon$ being small, the deformation of each of the arms 4 is hence effected within the elastic range and this deformation is reversible.

Figure 2:
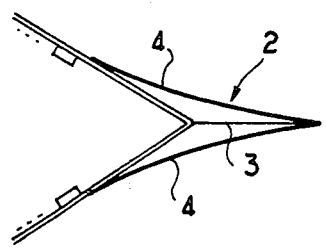
FIGS. 2 and 3 show diagrammatically, also in section, two folding operations of a solar panel about a fold line, effected by means of a folding system according to the invention.
Figure 3:
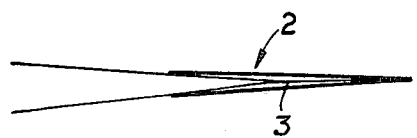
Figure 4:
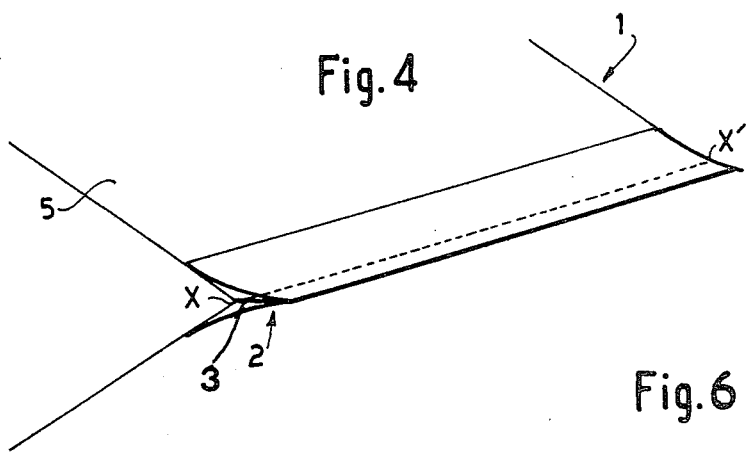
FIG. 4 is a diagrammatic perspective view of a solar panel folded by means of a folding system according to the invention.

While FIG. 1 shows the positioning of a folding system according to the invention on the rear surface of the solar panel in the deployed state, FIGS. 2, 3 and 4, show different folding stages of the solar panel 1 about the fold line XX'.

Figure 6:
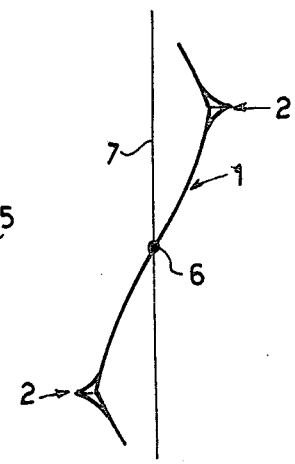
FIG. 6 shows diagrammatically an embodiment of a stabilizing system for a solar panel which cooperates with a folding system according to the invention.

In accordance with the invention, the solar panel provided with a folding system according to the present invention, can, as shown most clearly in FIG. 6, advantageously be provided with a stabilizing system for the panel outside of the plane of the unfolded array. Such stabilizing system includes an eyelet 6 fixed to the solar panel 1 between two consecutive fold lines XX', advantageously at mid-distance between the latter, and a cable 7 which passes through said eyelet. Such a stabilizing system improves the stability of the solar panel 1 outside of the plane, and avoids erratic movement of the solar panel 1 when it is deployed, during orbital manoeuvers or during an acceleration in orbit. The stabilizing system can also advantageously be applied to the ground tests carried out with a deployed solar panel 1.

By virtue of the fact that the folding of the solar panel 1 can only take place in a single direction, the fold line XX' not only preserves its memory, but additionally is provided with an "active" memory, thereby eliminates the risks of a rupture of the solar cells 5 in the vicinity of the fold lines XX' which could occur if the solar panels 1 were folded in the reverse direction. Consequently, the number of operational solar cells 5 in a vicinity of the fold lines XX' is not reduced in the course of operation. In addition, the folding and stabilizing systems according to the invention do not result in any limitation of the size of the solar panels 1 with which they are associated, so that the solar panels may be produced in any desired size. As a result, the necessary high power required for future applications of the solar panels 1 can easily be achieved without difficulty by means of the constructions according to the invention.

In an advantageous embodiment of the invention, the electrical wiring, placed on the rear surface of the solar panel 1 may be one of the principal constituents of the V-shaped element or may alone constitute said element.

Moreover, the V-shaped element 2 may be continuous or discontinuous element.

In accordance with further advantageous features of the invention, the V-shaped element and the stretcher sheet are continuous throughout the fold line XX'. By virtue of these features, the solar panel 1 is heavier, however, panels containing such features have two essential advantages, namely, that the folding system can be used even in situations where the rigidity outside of the plane of the solar panel 1 is high and that continuous electrical wiring may be provided on the rear surface of the solar panel 1 throughout the length of the fold line, XX'.

Figure 5:
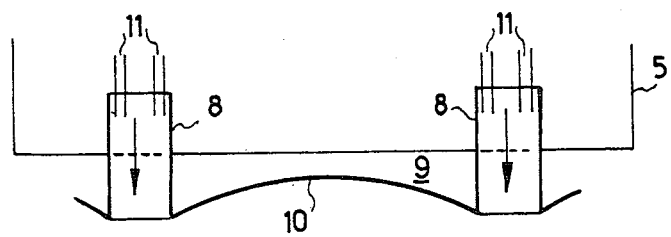
FIG. 5 is a diagrammatic illustration of another embodiment of a folding system according to the invention.

The V-shaped element 2 may, as shown most clearly in FIG. 5, be constructed in discontinuous form wherein the continuous V-shaped element 2 is replaced by a plurality of separate small V-shaped elements 8, while the stretcher 9 is continuous throughout the length of the fold line. The particular shape of the continuous stretcher 9 is to be noted, which connects the separate V-shaped elements 8 together and which is constituted by a sheet whose upper edge 10 has a sag to reduce the weight of the whole of the folding system and to eliminate compressive stresses which could be applied to it. The number of separate V-shaped elements 8 is dictated by the characteristics of the panel.

According to the invention, it is advantageous to concentrate the electrical wiring 11 exclusively in the separate elements 8.

As a result of the foregoing, whatever the embodiments and uses practised, systems of folding and stabilization of solar panels outside of the plane of the unfolded panel or array are obtained which have, with respect to previously known systems aimed at the same purposes, a large number of advantages, among which may be mentioned: the folding system does not have to be dismantled during the process of integrating solar cells; it is necessary to take into account, during fabrication and integration, only one single critical point represented by the need to keep the fold line quite straight; and the whole of the system is very light.

The folding and stabilizing systems according to the present invention enable a certain number of problems to be resolved which could not be done by the folding systems proposed in the prior art. In fact, the problem posed was to be able to fold and refold a thin sheet, namely a solar panel, along a predetermined line, the fold line, knowing that said sheet had a marked instability under the effect of compressive loads and shearing loads and that it had no memory outside of the plane of the unfolded panel or array. The solution proposed according to the present invention is represented by an active memory system including a V-shaped element whose rigidity outside of the plane is greater than that of the folded solar panel and which provides, in association with the aforesaid stretcher, the active memory required for repeated operations of consecutive folding and deployment without losing its memory, by reason of its structure.

Thus, as emerges from the foregoing, the invention is not limited in any way to those of its embodiments and uses which have just been described more explicity; it encompasses, on the contrary, all modifications which may occur to the technician skilled in the art, without departing from the scope or the spirit of the present invention.

I claim:

1. Apparatus comprising flexible and continuous solar arrays, wherein said solar arrays have fold lines formed on each array at regular intervals, and wherein said apparatus includes systems for folding said solar arrays, said folding systems including (1) V-shaped elements whose rigidity outside the plane of the unfolded array is greater than that of the folded array, each of said V-shaped elements being fixed by one of its free ends to the solar array on one side of a fold line of an array and being fixed by the other of its free ends to the solar array on the other side of the fold line, and (2) stretchers connecting the tip of the V of each of said V-shaped elements to said fold line.

2. Apparatus according to claim 1, wherein the arms of the V-shaped element have a camber when the panel is unfolded, so as to exert a pulling force on the fold line.

3. Apparatus according to claim 1, wherein the arms of the V-shaped element are fixed through their free ends to the panel, at a predetermined distance b from the fold line, and wherein the width of the stretcher—calculated from the inner top of the V to the fold line—is equal to B and the length of each of said arms is equal to b+B, whereby the arms of the V-shaped element are elastically deformed when the array is unfolded.

4. Apparatus according to claim 3, wherein said folding systems are positioned on the rear surface of said solar array, with said front surface of said solar array including solar cells.

5. Apparatus according to claim 1, wherein said system further comprises electrical wiring means which is located entirely on the rear surface of the solar array.

6. Apparatus according to claim 1, wherein said systems include electrical wiring means, which electrical wiring means forms at least part of the V-shaped element.

7. Apparatus according to claim 1, wherein the V-shaped element and the stretcher are continous over the whole length of the fold line.

8. Apparatus according to claim 1, wherein the V-shaped element is discontinuous in that it is constituted by a plurality of small V-shaped elements, while the stretcher is continuous over the whole length of the fold line and connects the small V-shaped elements together.

9. Apparatus according to claim 1, wherein the V-shaped element is discontinuous in that it is constituted by a plurality of small V-shaped elements, while the stretcher is continuous over the whole length of the fold line and connects the small V-shaped elements together, and further including electrical wiring means concentrated within the plurality of small V-shaped elements.

10. Apparatus according to claim 1, further including a stabilizing system for the array outside of the plane of the unfolded array, which comprises a plurality of eyelets arranged on the array, positioned between consecutive fold lines, and a cable means which passes through said eyelets.

11. Apparatus according to claim 10, wherein said folding systems are positioned on the rear surface of said solar array, with said front surface of said solar array including solar cells.

12. Apparatus according to claim 1, further including in association with said systems, a stabilizing system for the array outside of the plane of the unfolded array, which comprises a plurality of eyelets arranged on the array, between consecutive fold lines, and a cable passing through said eyelets, and wherein each of the arms of the V-shaped element is fixed through its free end to the array, at a predetermined distance b from the fold line, the width of the stretcher—calculated from the inner top of the V to the fold line—is equal to B and the length of each of said arms is equal to b+B, whereby the arms of the V-shaped element are elastically deformed when the array is unfolded, and further including electrical wiring means concentrated in the V-shaped elements.

13. Apparatus according to claim 12, wherein said folding systems are positioned on the rear surface of said solar array, with said front surface of said solar array including solar cells.

14. Apparatus according to claim 1, further including in association with said system, a stabilizing system for the panel outside of the plane of the unfolded array, which comprises a plurality of eyelets arranged on the array, between consecutive fold lines, and a cable passing through said eyelets, and wherein each of the arms of the V-shaped element is fixed through its free end to the array, at a predetermined distance b from the fold line, the width of the stretcher—calculated from the inner top of the V to the fold line—is equal to B and the length of each of said arms is equal to B+B, whereby the arms of the V-shaped element are elastically deformed when the array is unfolded, and further including electrical wiring means concentrated in the V-shaped elements, and wherein the eyelets are placed at half-distance between two consecutive fold lines.

15. Apparatus according to claim 1, further including stabilizing system means for improving the stability of the solar array, outside of the plane of the unfolded array.

16. Apparatus according to claim 1, wherein said systems are positioned on the rear surface of said solar array, with said front surface of said solar array including solar cells.

* * * * *